(12) United States Patent
Wang

(10) Patent No.: US 12,192,028 B2
(45) Date of Patent: Jan. 7, 2025

(54) SYSTEM AND METHOD FOR A SMART HOME SYSTEM

(71) Applicant: Focus Universal Inc., Ontario, CA (US)

(72) Inventor: Desheng Wang, Diamond Bar, CA (US)

(73) Assignee: Focus Universal Inc., Ontario, CA (US)

(*) Notice: Subject to any disclaimer, the term of this patent is extended or adjusted under 35 U.S.C. 154(b) by 0 days.

(21) Appl. No.: 17/747,811

(22) Filed: May 18, 2022

(65) Prior Publication Data
US 2022/0376942 A1 Nov. 24, 2022

Related U.S. Application Data

(60) Provisional application No. 63/190,558, filed on May 19, 2021.

(51) Int. Cl.
*H04L 12/28* (2006.01)
*G05B 15/02* (2006.01)

(52) U.S. Cl.
CPC .......... *H04L 12/2814* (2013.01); *G05B 15/02* (2013.01); *H04L 2012/2841* (2013.01)

(58) Field of Classification Search
None
See application file for complete search history.

(56) References Cited

U.S. PATENT DOCUMENTS

| | | |
|---|---|---|
| 3,973,240 A | 8/1976 | Fong |
| 4,479,215 A | 10/1984 | Baker |
| 5,264,823 A | 11/1993 | Stevens |
| 5,852,636 A | 12/1998 | Mathieu et al. |
| 6,329,905 B1 | 12/2001 | Cunningham |
| 6,608,552 B1 | 8/2003 | Fogel et al. |
| 7,076,378 B1 | 7/2006 | Huebner |

(Continued)

FOREIGN PATENT DOCUMENTS

| CN | 1171669 A | * | 1/1998 | |
|---|---|---|---|---|
| CN | 109302464 B | * | 9/2021 | .............. G05B 15/02 |

(Continued)

OTHER PUBLICATIONS

Author: Suganya K, et al. Title: Development of Control Application Using Power Line Communication Year: 2014 (Year: 2014).*

(Continued)

*Primary Examiner* — Kamal M Hossain (74) *Attorney, Agent, or Firm* — Dority & Manning, P.A.

(57) ABSTRACT

Disclosed is a smart home system for controlling peripheral devices. The smart home system allows a single computing device to control a plurality of peripheral devices. The system can include a crystal oscillator. The computing device connects to a universal device. The universal device connects to one or more system modules. The universal device and system modules communicate using a protocol stored, at least in part, on both the universal device and system modules. The use of the protocol and the system module to peripheral device interface allows for a universality of peripheral devices. That is, the smart home system allows for the extension of smart control to non-traditional smart devices.

18 Claims, 5 Drawing Sheets

(56) References Cited

U.S. PATENT DOCUMENTS

| | | |
|---|---|---|
| 7,128,466 B2 | 10/2006 | Chang et al. |
| 7,424,065 B2 | 9/2008 | Walker |
| 7,800,491 B2 | 9/2010 | Kodama et al. |
| 7,962,118 B2 | 6/2011 | Schwager et al. |
| 8,072,323 B2 | 12/2011 | Kodama et al. |
| 8,209,677 B2 | 6/2012 | Shintani et al. |
| 8,693,605 B2 | 4/2014 | Wolter et al. |
| 8,907,529 B2 | 12/2014 | Hyde et al. |
| 9,214,985 B2 | 12/2015 | Wolter et al. |
| 9,276,633 B2 | 3/2016 | Chen et al. |
| 9,509,456 B2 | 11/2016 | Ott et al. |
| 9,924,295 B2 | 3/2018 | Wang |
| 10,251,037 B2 | 4/2019 | Wang |
| 11,546,017 B2 | 1/2023 | Wang et al. |
| 2004/0086053 A1* | 5/2004 | Anderson ............... G01N 22/04 375/257 |
| 2004/0122531 A1 | 6/2004 | Atsuta et al. |
| 2005/0172056 A1* | 8/2005 | Ahn .................... H04L 12/2832 710/72 |
| 2013/0245965 A1 | 9/2013 | Kane et al. |
| 2014/0062339 A1* | 3/2014 | Wiscombe ........... H05B 47/185 315/307 |
| 2014/0375428 A1 | 12/2014 | Park |
| 2016/0262244 A1* | 9/2016 | Campbell ............ H05B 47/185 |
| 2017/0131697 A1* | 5/2017 | Wheeler ............ G05B 19/0426 |
| 2017/0208420 A1 | 7/2017 | Wang |
| 2018/0213380 A1 | 7/2018 | Wang |
| 2021/0382749 A1* | 12/2021 | Chen ....................... G06F 1/266 |
| 2022/0286161 A1 | 9/2022 | Wang et al. |
| 2022/0376643 A1 | 11/2022 | Wang |
| 2023/0216541 A1 | 7/2023 | Wang et al. |

FOREIGN PATENT DOCUMENTS

| | | | |
|---|---|---|---|
| EP | 2403151 A1 * | 1/2012 | ............... H04B 3/54 |
| WO | WO 2021/107961 | 6/2021 | |

OTHER PUBLICATIONS

Shachi, P. "Evaluation of Costas Loop for BPSK Demodulation" IJECT vol. 7, Issue 3, Jul.-Sep. 2016. Obtained from https://www.semanticscholar.org/paper/Evaluation-of-Costas-Loop-for-BPSK-Demodulation-Shachi/13dd3b55ddb80f24089a37cea3c5c64e7287fdf3 (Year: 2016).

* cited by examiner

SYSTEM AND METHOD FOR A SMART HOME SYSTEM

CROSS-REFERENCE TO RELATED APPLICATIONS

The present application claims the benefit of priority to U.S. Provisional Patent Application No. 63/190,558, filed May 19, 2021, the disclosure of which is hereby incorporated by reference in its entirety. Any and all applications for which a foreign or domestic priority claim is identified in the Application Data Sheet as filed with the present application are hereby incorporated by reference under 37 CFR 1.57.

FIELD

The present invention relates to a system and method of providing a smart home system to control many of a residential dwelling's mechanical and electrical systems.

BACKGROUND

Current state of the art in smart home technology is based on brand-centric eco systems. That is, groups of devices from a single company which share an operating environment. For example, one company may produce a smart speaker which may include some version of virtual assistant technology. The same company may also produce a camera which allows a user to monitor the interior or exterior, or both, of the user's residence remotely over the internet. The same company may further produce a doorbell system which includes a camera which a user may use to see who is at their door, even from a remote location, when the doorbell is rung. Because the devices are all from a single source, they share an operating environment and are thus guaranteed to interoperate. However, they are also marketed as standalone products. Thus, many of such smart home products have redundant features which elevate the cost of each item of the smart home system.

However, if a consumer favors the features of a smart speaker from one company and a doorbell system from a different company, there is no guarantee the two will interoperate, in fact, the truth is quite the opposite, the two devices are nearly guaranteed to not interoperate. Further, many of the devices may have features which are surplus to the needs of most users. Sometimes these features are to enable interoperability, other times they are added by the company creating the product to appeal to consumers. However, each consumer is different and the additional features may be unwanted.

Making matters worse, the ecosystems are often created haphazardly. A typical scenario includes a company creating a first device. The operating environment is often created with only the device itself in mind. Such a first product must be a success in order for the company to raise enough capital to research and develop follow on products. Thus, the first product is optimized for its particular purpose without regard for interoperability in an ecosystem. If the first product is a success, the company must develop interoperability with the first device, which is almost exclusively optimized for anything but interoperability. Thus, the company must use less than ideal means to establish interoperability in creating an ecosystem of devices.

Sometimes the choices in creating devices for an ecosystem are dominated by economics. Price of any device is always a factor in how well a particular device or group of devices will function in an ecosystem. While it may be technically possible to include a myriad of possible wired and wireless connections for the devices in an ecosystem, the cost to do so would lead to pricing that is not competitive in the consumer marketplace. Typically, this leads to the company choosing a single, often wireless, connection method for the ecosystem. The choice of a wireless connection eliminates concerns regarding what wired infrastructure the consumer may have. However, the wireless connection may be suboptimal for any number of reasons, but the consumer is left with no choice.

For the foregoing reasons, there is a need for a smart home system which has a competitive cost, but offers choice of devices and connectivity.

SUMMARY

Disclosed is a smart home system for controlling devices. The smart home system may include a computing device and one or more system modules. The one or more system modules may be electrically connected to the computing device. The one or more system modules may include one or more unique functions, circuity for performing the one or more unique functions, a transceiver, a memory, and a processor. A protocol stored on the memory and executing on the processor may exchange messages, including initialization information, with the computing device. The smart home system may further include a universal device interposed between the computing device and the one or more system modules, so that the universal device may exchange messages with both the computing device and the one or more system modules. The universal device may include an aggregation of any circuit or component that would otherwise be required for the operation of the one or more system modules, and a transceiver for sending data to, and receiving data from, the computing device. The smart home system may further include a software application stored on non-transient media on the computing device which may include instructions for requesting the initialization information from the one or more system modules.

Further disclosed is a method for providing control of a smart home system. The method may include providing a computing device which may include a display. The method may further include connecting a universal device to the computing device via a wired or wireless connection, and connecting one or more system modules to the universal device via a wired or wireless connection. The method may further include sending a message from the computing device to the one or more system modules. The message may request initialization information. The method may further include sending a message from the one or more system modules to the computing device. The message may include the initialization information. The initialization information may include information regarding one or more unique functions of the corresponding one of the one or more system modules and control parameters of the one or more functions. The method may further include creating a user interface for displaying on the display of the computing device. The user interface may include control surfaces which, when manipulated by a user, cause a change in a value of one of the control parameters of one of the one or more functions of the peripheral device.

Further disclosed is a smart home system for providing ubiquitous control. The smart home system may include a computing device for sending commands which may be interpreted by a protocol. The smart home system may further include a universal device. The universal device may include a transceiver which may send data to, and receive data from, the computing device, and a non-transient media, which may contain the protocol. The smart home system may further include one or more system modules connected to the universal device. The one or more system modules may each include one or more unique functions, the one or more system modules may communicate with the universal device using the protocol. The smart home system may further include a software application stored on non-transient media on the computing device. The software application may include instructions for requesting the initialization information from the one or more system modules and may include instructions for creating a user interface based on the initialization information. The user interface may include one or more control surfaces which correspond to the one or more unique functions identified in the initialization information.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of system and method to make and use a smart home system, and is not intended to represent the only form in which it can be developed or utilized. The description sets forth the functions for developing and operating the system in connection with the illustrated embodiments. It is to be understood, however, that the same or equivalent functions may be accomplished by different embodiments that are also intended to be encompassed within the scope of the present disclosure. It is further understood that the use of relational terms such as first, second, distal, proximal, and the like are used solely to distinguish one from another entity without necessarily requiring or implying any actual such relationship or order between such entities.

Disclosed is a smart home system and method. The smart home system may include a computing device. By way of example and not limitation, the computing device may be a smart phone, a tablet computer, or a laptop computer. Alternatively, the computing device may be any device which provides a display to display control surfaces, and allow the control surfaces be manipulated to cause the smart home system to send commands. The computing device may be connected to a universal device through a wired or wireless connection. The universal device may connect to one or more system modules through another wired or wireless connection. The universal device and the system modules may use an open source protocol to communicate. Each of the one or more system modules may be connected to a peripheral device. The peripheral devices may be from a plurality of manufacturers. None of the peripheral devices need any logic circuits, because rather than each of the peripheral devices having logic circuits, many portions of which are redundant, the functions of the logic circuit are apportioned to the universal device and the one or more modules. The circuits and components common to all the traditional smart devices on the smart home system and their corresponding functions may be apportioned to the computing device or universal device, or both. The unique circuits and components to the traditional smart devices on the smart home system and their corresponding functions may be apportioned to the corresponding system module. By way of example and not limitation, the peripheral devices may include lights, fans, outdoor sprinkler valves, garage door openers, automated blinds, thermostats, doorbell camera systems, and medical devices.

The computing device, either when it is connected to the smart home system, or when a new peripheral device is connected to a smart home system which already has a computing device connected, may send a message to the universal device requesting initialization information regarding connected system modules and peripheral devices. The initialization information may include the type of system module, what controllable functions the system module has, and what the parameters are in controlling the functions. The initialization information may be used by a software application stored on the computing device to create a user interface. The user interface may have control surfaces for controlling the parameters of the functions.

The system module may have more than one function. By way of example and not limitation, the device may have a first function which responds to a binary control parameter. This control parameter may be, for example, state of operation control parameter which includes the values "on" and "off." The device may have a second function which has a control parameter which includes a range of values. For example, the range of values may be a wattage value, or may be an indexed number, for example 1 to 10, used to designate levels of resistance in a circuit, to control a volume level.

Figure 1:
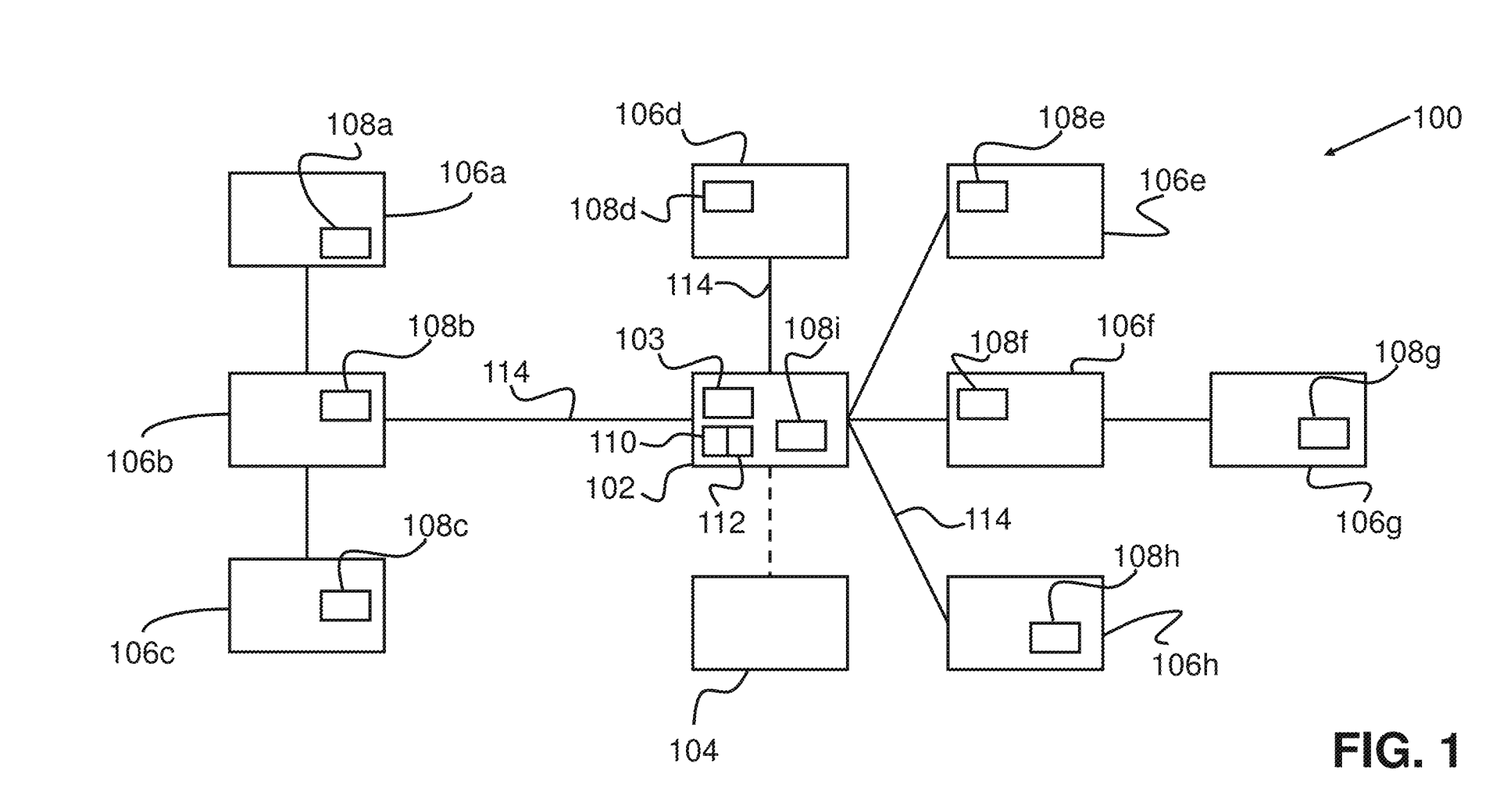
FIG. 1 shows a schematic diagram of the smart home system.

More specifically, with reference to FIG. 1, the smart home system 100 may include a computing device 104. The computing device 104 may be a mobile computing device. For example, Android®, iOS®, and Windows® based mobile computing devices, such as smart phones and tablets. The computing device 104 may also be a laptop or a desktop computer. The software application running on the computing device 104 may be an application, often abbreviated as an "app," programmed to operate on, for example, Android®, iOS®, or Windows® operating systems, or a combination of more than one of the operating systems, or may be a software package available for personal computers running operating systems such as Microsoft® Windows®, Mac® OS, Unix, Linux, etc., or a combination of more than one of the operating systems.

Alternatively, or in addition, the smart home system 100 may include a control panel 103 hardwired to, or integrated with, the universal device 102. This configuration may allow a user to use the computing device 104 as an extension of the control panel 103, or to operate the system from the control panel 103. Thus, the control panel 103 and the computing device 104 can be used in parallel, for example, to operate two different system modules 106a-h contemporaneously. The control panel 103 may be a programable logic controller or the like. Alternatively, the control panel 103 could be a tablet computer hardwired to the universal device 104. The control panel 103 may include a wireless module which allows the control panel 103 to communicate with the computing device 104, and allows for pass through of computing device 104 messages to the universal device 102. For ease of explanation, when used in the remainder of this disclosure, the term "universal device," is understood to include the controller 103, among other hardware, unless specifically stated otherwise.

The computing device 104 may send messages to the universal device 102. The universal device 102 may include a programming which allows the universal device 102 to interoperate with computing devices 104 using various operating systems. Because of this feature, not only may more than one computing device 104 be used with the system, but each computing device 104 may have a different operating system. This interoperation is part of what makes the universal device 102 operate in a universal manner. The universal device 102 may receive messages from, and send messages to, any computing device 104 which a user wishes to place in to operation on the smart home system 100, making the universal device 102 agnostic in regard to the interoperability with computing devices 104 based on any of a number of operating systems.

The universal device 102 performs several functions. First, the universal device 102 converts the messages of the computing device 104 to the protocol. The universal device 102 includes instructions which allow the universal device 102 to recognize which operating system the computing device 104 is using, and establish bilateral communication with the computing device 104. Then, based on the messages sent by the computing device 104, the universal device 102 converts the messages in to the protocol used for communication between the universal device 102 and the system modules 106a-h. Second, the universal device 102 provides routing functions for messages sent by the computing device 104 to the various system modules 106a-h. Third, the universal device 102 provides device management. When a new system module 106a-h is added, the universal device 102 may detect the addition of the system module 106a-h and request initialization information. The initialization information may include an identification code for the system module 106a-h, what functions the system module 106a-h has, and what the control parameters for the functions are. The universal device 102 may store this information in a non-transient media memory. The universal device 102 may also pass the initialization information to the computing device 104 in a message.

Physically, the universal device 102 may be a standalone device or may be integrated with the controller 103 as discussed above. The universal device 102 and controller 103 combination may include a screen which allows a user to view data passed from the system modules 106a-h and to generate commands to be sent to the system modules 106a-h for action on the peripheral devices to which the system modules 106a-h may be electrically connected. The universal device 102 may include a number of circuits and components which would be common to the traditional peripheral devices the smart home system 100 integrates. By way of example and not limitation, both a thermostat and a sprinkler control system may include display screens. Rather than have a display screen on both of the sprinkler control system and the thermostat, the display on the computing device 104 or on the universal device 102, or both, provide a display which performs all the display tasks for the smart home system 100. Thus, this one display on the computing device 104 or the universal device 102 replaces the screens on the traditional sprinkler system and thermostat. The universal device 102 may include other circuits or components that would be common to all traditional peripheral devices. The inclusion of these components and circuits in the universal device 102 or computing device 104 or both, through either hardware or software, integrates tasks which would normally be performed by a traditional peripheral device in to the universal device 102 and the computing device 104.

The system modules 106a-h include circuits and components which perform tasks which are either unique to a traditional peripheral device, or only included in a minority of traditional peripheral devices. When the circuits and components, and therefore the corresponding functions, are either unique to a traditional peripheral device, or only included in a minority of traditional peripheral devices, they cannot be effectively integrated in to a hub of a smart home system 100. The hub of the smart home system 100 may include the computing device 104 and the universal device 102. Stripped down to these unique circuits and components, each system module 106a-h takes a non-traditional form. In fact, either portions, or an entirety of, traditional peripheral devices may be replaced by the system modules 106a-h, which perform the functions unique to the traditional peripheral devices while the universal device 102, or the combination of the universal device 102 and computing device 104 perform functions common to all the traditional peripheral devices. At a minimum, the computing device 104 or the universal device 102, or both in combination, take over some of the tasks previously performed by the traditional peripheral device.

An exception to the distribution of common functions to the hub and unique functions to the system modules 106a-h is the transceivers 108a-i on both the universal device 102 and the system modules 106a-h. These transceivers 108a-i may be nearly identical. The transceivers 108a-i may contain the transmission circuit and the receiver circuit described in detail below. The transceivers 108a-i are included in both the universal device 102 and each of the system modules 106a-h because communication cannot be distributed to a single device, particularly when the communication is bi-directional as the protocol requires.

The system modules 106a-h, in some circumstances, may take a traditional peripheral device, which was not "smart" upon manufacture and transform the traditional peripheral device in to a smart device. By way of example and not limitation, a sprinkler system is traditionally a standalone system which may not be controlled by a mobile device, or as part of an integrated smart home system. However, using a system module 106a-h to replace the traditional controller of the sprinkler system, the sprinkler system is readily integrated in to the disclosed smart home system 100. The pump included in a swimming pool filtration system may also be added to the smart home system 100 in a similar way. The addition of atypical devices to the smart home system 100 is another way in which the smart home system 100 creates universality.

Moreover, the system modules 106a-h for traditionally non-smart devices, for example, lamps, can, in addition to making the lamp part of the smart home system, add smart features to the lamp. For example, a dimming feature, controllable by the computing device 104 and the universal device 102, may be added to the system module 106a-h for the lamp. The system module 106a-h could use a variable resistor, the level of which may be set by a control surface on a user interface created by a software application, to vary the wattage to the lamp. Thus, lamps which were previously either on or off only may now be dimmed. Thus, not only may features be off loaded to the computing device 104 and the universal device 102 to remove common circuits and components from the module, but new features may be added that would have been prohibitively expensive to add to a lamp without the disclosed smart home system 100.

In some instances, the system modules 106*a-h* may be collocated with the peripheral device. In other instances, the system module 106*a-h* may be placed at a location other than the location of the peripheral device. By way of example and not limitation, the system module 106*a-h* for a thermostat may replace the thermostat in a retrofit, or may be placed in the location that would have been reserved for the thermostat in new construction structure. In contrast, the system module 106*a-h* for a peripheral device which does not traditionally have a logic circuit such as a lamp, may be placed in a light switch which controls the power to the circuit in which the lamp is connected to power, or in the power outlet in which the lamp is plugged. In this circumstance, the system module 106*a-h* for the lamp will include circuitry which includes a switch. The switch may be operated remotely by messages sent from the computing device 104, and passing through the universal device 102, as is described in detail below. The switch which is integrated with the lamp during manufacture may be left in the "on" position. The system module 106*a-h*, when commanded, closes the module switch, allowing power to flow to the lamp. If the system module 106*a-h* were to fail, the lamp could still be operated as normal using the switch integrated during manufacture. Thus, when the system module 106*a-h* is not collocated with the peripheral device, the system module 106*a-h* may have less impact on the operation of the peripheral device, should the system module 106*a-h* fail. The same may not be true of a collocated system module 106*a-h* and device or standalone system module 106*a-h*, for example, a system module 106*a-h* replacing the thermostat.

Because only the most unique functions of the traditional peripheral device are preserved in the system module 106*a-h*, and the redundant and common circuits and components off loaded to the computing device 104 and universal device 102, the cost to produce the system modules 106*a-h* is lower than the traditional peripheral devices they replace. Because some of the functions previously performed on the traditional peripheral device are off loaded to the computing device 104 and universal device 102 in the disclosed smart home system 100, the components for those functions are no longer needed by the system modules 106*a-h*. This lowers the cost to produce a system module while also making the smart home system more user friendly. The smart home system may be more user friendly because a user no longer has to go to an installation site of, for example, a sprinkler system to operate the sprinkler system, or to the installation site of a thermostat to operate the thermostat. Rather, the user can operate all of the modules on the smart home system 100 from a single location. That location may be a mobile computing device 104, or a fixed location computing device 104, a control panel 103, or all of the above in any combination.

The system modules 106*a-h* may be connected to the universal device 102 via a wired or wireless connection. When the system modules 106*a-h* are connected to the universal device 102 via a wired connection, they made be connected by a dedicated wiring infrastructure, for example, an ethernet wiring infrastructure, or they may be connected through a wiring system in which the control signals of the smart home system 100 are combined with other signals. For example, the existing power lines of a structure may be used to send control signals using the protocol on a power line control (PLC) system discussed in detail below.

Further, when peripheral devices are purchased for use in conjunction with the smart home system 100, the peripheral devices may be the most basic models which have no smart features. For example, a garage door controller may be purchased without any ability to connect through wireless means, or any other smart features. Such features may be added through one or more of the system modules 106*a-h*. Being able to purchase baseline models lowers cost for the consumer. Moreover, any of these models may be made "smart" through the use of system modules 106*a-h*, and the peripheral devices are guaranteed to interoperate with the disclosed smart home system 100 by the use of the system modules 106*a-h*.

As can be easily understood from the discussion of the components of the system, the disclosed smart home system 100 is customizable to every user. The only absolute requirement for each user would be to purchase the universal device 102. Even at that, there may be more than one model of the universal device 102. By way of example and not limitation, the universal device 102 may have a first model which relies on the computing device 104 for the display, and all commands must be sent using the computing device 104. Alternatively, another model of the universal device 102 may be integrated with a controller 103 as discussed above. This would allow parallel use of the controller 103 and computing device 104 in sending commands, or for a user to choose between exclusive use of the controller 103 or computing device 104 from time to time. The system modules 106*a-h* may be purchased based on which peripheral devices a user wishes to control. Thus, a user living in a home in a geographic region with heavy year-round rainfall may choose to not purchase a sprinkler system module because the user's home does not have sprinklers. However, the same user may purchase one or more light modules to intelligently control the lighting of the home.

The smart home system 100 also prevents consumers from paying for features they will not use. Most traditional peripheral devices include a feature set which maximizes the technology present in the device, rather than being based on the features most used by consumers. The system modules 106*a-h* allow control of the essential aspects of the devices without adding features which have more marginal usefulness. For example, with lights or lamps one embodiment of system module may only allow turning the light off or on. However, another system module for lights may allow a user to both turn the light on or off, and allow dimming. Similarly, for a pool pump control system module, a base module may allow programming of a single operation cycle and manual controls. Another, upgraded pool pump system module would include all of the features of the baseline module and additional features, such as multiple operation cycles and control of separate zones, for example, a spa and a pool zone.

In operation, the smart home system 100 may seek to maximize the utility of available communication links. For example, the smart home system 100 may use a wired connection for all the devices on the system which are local and must be powered. For example, the smart home system may incorporate PLC for the wired connection. In PLC the connection is made using a structure's preexisting power lines. In addition to the power signal, which may be provided from an external source, such as a servicing utility company, additional signals may be added locally to the power line. These signals may be control signals that allow the smart home system 100 to control any module which is electrically connected to the power lines of a residence.

A touch screen (not shown) on the controller 102 or computing device 104 may be used as a system interface by a user (not shown). Certain commands which may be executed by the protocol may be indicated by visual representations on the touch screen. For example, the commands may be indicated by icons or text, or a combination of both. When a user touches the portion of the screen with the visual representation, a command is sent in a message to the universal device, which interprets the command using the protocol.

A PLC transceiver 108*i* may be integrated with the universal device 102. The primary function of the PLC transceiver 108*i* is to send signals as directed by the controller 102, or the computing device 104, or both. The PLC transceiver 108*i* sends a signal upon which control information is encoded. The PLC transceiver may also receive data signals from the system modules 106*a-h*. For example, the system modules 106*a-h* may send acknowledgements of messages or self-identification information to the universal device 102.

The PLC transceiver 108*a-i* includes a crystal oscillator circuit (not shown). The crystal oscillator circuit draws power from the power line 114. The power is taken from the power line 114 and transformed down from 110V to 0.1V. On a 10 amp circuit of the power line 114, the 0.1V of transformed voltage produces one watt of power for the crystal oscillator circuit. As long as the crystal oscillator receives power, the crystal oscillator will continue to output the wave signal.

Crystal oscillators emit a sinusoidal wave at a frequency determined by their physical structure. Most importantly to the disclosure, crystal oscillators, and particularly quartz crystal oscillators, have a very high Q factor. The Q factor, as is well known in the art, is the resonant frequency of the crystal divided by the bandwidth. Quartz crystal oscillators are capable of primary frequencies in the high kHz up the MHz range. Also, as indicated by the high Q factor, they have a narrow bandwidth. A typical Q factor for a quartz oscillator ranges from $10^4$ to $10^6$, compared to $10^2$ for an inductor and capacitor, or LC, oscillator. The maximum for a high stability quartz crystal oscillator can be estimated as $Q=1.6 \times 10^7/f$, where f is the resonant frequency in megahertz.

Another important aspect of quartz crystal oscillators in light of the disclosure is that quartz crystal oscillators exhibit very low phase noise. In many oscillators, any spectral energy at the resonant frequency is amplified by the oscillator, resulting in a collection of tones at different phases. In a crystal oscillator, the crystal mostly vibrates on one axis, therefore only one phase is dominant. Low phase noise makes crystal oscillators particularly usefdl in applications requiring stable signals and very precise time references.

A quartz crystal provides both series and parallel resonance. The series resonance is a few kilohertz lower than the parallel resonance. Crystals below 30 MHz are generally operated between series and parallel resonance, which means that the crystal appears as an inductive reactance in operation, this inductance forming a parallel resonant circuit with externally connected parallel capacitance. Any small additional capacitance in parallel with the crystal pulls the frequency lower. Moreover, the effective inductive reactance of the crystal can be reduced by adding a capacitor in series with the crystal. This latter technique can provide a useful method of trimming the oscillatory frequency within a narrow range; in this case inserting a capacitor in series with the crystal raises the frequency of oscillation. For a crystal to operate at its specified frequency, the electronic circuit has to be exactly that specified by the crystal manufacturer. Note that these points imply a subtlety concerning crystal oscillators in this frequency range: the crystal does not usually oscillate at precisely either of its resonant frequencies.

Crystals above 30 MHz (up to >200 MHz) are generally operated at series resonance where the impedance appears at its minimum and equal to the series resistance. For these crystals the series resistance is specified (<100Ω) instead of the parallel capacitance. To reach higher frequencies, a crystal can be made to vibrate at one of its overtone modes, which occur near multiples of the fundamental resonant frequency. Only odd numbered overtones are used. Such a crystal is referred to as a 3rd, 5th, or even 7th overtone crystal. To accomplish this, the oscillator circuit usually includes additional LC circuits to select the desired overtone.

The signal created by the crystal oscillator circuit 110 is next routed to a switch 114. The switch 114 may be a fast switching operation, as is well known in the art, or any other switch which is able to provide fast enough switching, including transistors which may act as switches by having a voltage applied to, and then disconnected from, the base of the transistor. In this disclosure, the switch may be a single pole, dual throw, or SPDT switch. An SPDT may have a single common connection on one side, and two terminals on the opposite side. When the switch is operated, the switch moves from a first terminal to the second terminal. When switched again, it moves from the second terminal back to the first terminal. An incoming signal from the crystal oscillator circuit 110 is connected to the common. Connected to the first terminal of the switch 114 is a phase inversion circuit 116. Connected to the second terminal of the switch 114 is a bypass 118. The speed of the switch 114 allows for very rapid alternation between the bypass and the phase inversion circuit, or between the first and second terminals. By way of example and not limitation, the switch 116 may cycle fast enough to switch 100 times from the bypass to the phase inversion circuit and back to the bypass in a single cycle of a 20 MHz signal. Thus, there is an opportunity, depending on the protocol used by the system, to send 100 bits of information in a single 20 MHz cycle. In this example, the system could generate 2 billion bits of information a second. Alternatively, the switch may cycle fewer than 100 times in a 20 MHz cycle, or more than 100 times in a 20 MHz cycle. Still further alternatively, the crystal oscillator may generate a sinusoidal wave at more than 20 MHz or less than 20 MHz. The operation of the system, including the creation and modification of the sinusoidal wave produced by crystal oscillator is discussed in great detail below. The transmission portion 106 is electrically connected to an emitter output 120, which is in turn connected to the power line 114.

The universal device may include a memory 112 on which a protocol is stored, and a processor 110 which is electrically connected to the memory, and on which the protocol is executed. The protocol may include a portion which interprets commands sent by the controller 102 or computing device, or from a module transceiver. The protocol, executed by the processor 110, accomplishes the encoding of the sinusoidal wave of the crystal oscillator circuit by controlling the switch.

The protocol is designed so that messages include an identifier as to which system module 106*a-h* the message is directed. Although eight system modules are shown, it will be understood that the smart home system 100 may have more than eight system modules or less than eight system modules. If a message is not directed to a particular system module 106*a-h*, that system module 106*a-h* ignores the message.

The protocol may be standardized. That is, it may have a set sequence of digits or characters that correspond to the execution of a particular command. The protocol may include a plurality of the digit or character sequence to command correspondences. If fact, there might be a list that is fixed at any moment in time which a manufacturer can consult while developing a product. New commands may be developed and added as a need arises. Because the protocol is standardized, anyone can use commands from the list while being assured that the commands will have the intended effect. Part of the protocol may also be a conversion module. The conversion module is bidirectional. That is, the conversion module may take messages or commands from the protocol and convert them in to messages or commands that may be executed or communicated on a specified operating system. In fact, the protocol may be designed so that the conversion module may allow a user to take a computing device 104 using any common operating system, and be guaranteed that the operating system and the protocol will interoperate. The same is true of commands and messages generated by the computing device 104. The commands and messages generated by the computing device 104 will be converted in to the corresponding digit or character sequence and sent to the system module 106 or system modules 106a-h for execution. This means that any computing device 104 may be chosen for interoperation, and any system module 106 may be later added and the protocol will allow for it to interoperate not just with the computing device 104 or universal device 102, but with other system modules 106.

Upon addition to the smart home system 100, each system module 106a-h may send self-identification information to the universal device 102. The universal device 102 may, in turn, send some or all of the self-identification information to the computing device 104. The self-identification information may include an identifier for the system module. The identifier may be a binary sequence. The self-identification information may further include which features may be controlled through the user interface, and which type of control surface corresponds to each feature. The self-identification information may also include what control parameters correspond to the control surface for controlling a particular feature.

Figure 2:
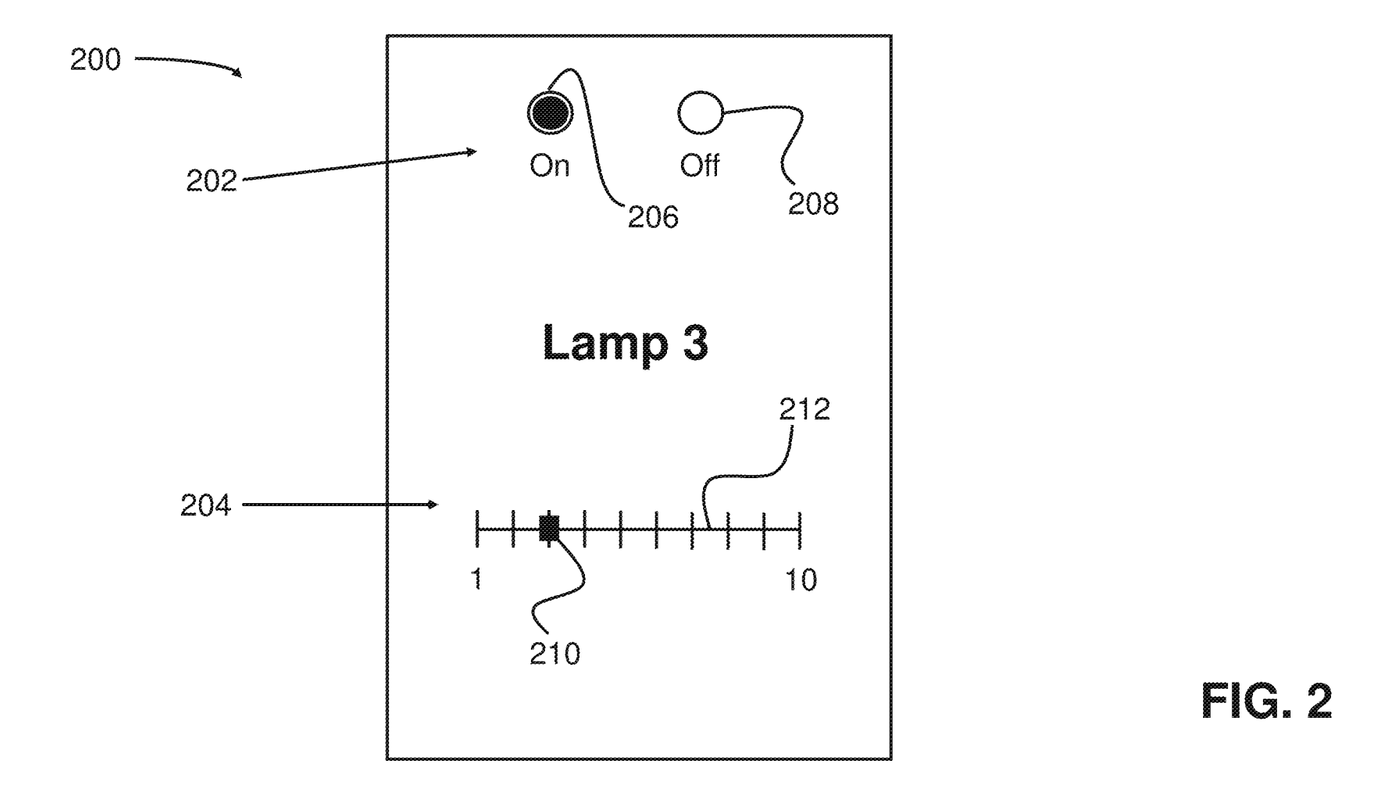
FIG. 2 shows a plan view of a user interface.

With reference to FIGS. 1 and 2, the initialization information may be used by a software application stored on the computing device 104 to create a user interface 200. The user interface 200 may have control surfaces 202, 204 for controlling the parameters of the functions. One or more of the system modules 106a-h may have more than one function. By way of example and not limitation, the one or more system modules 106a-h may have a first function which responds to a binary control parameter. This control parameter may be, for example, state of operation control parameter which includes the values "on" and "off." As a part of the user interface 200, the software application may create a control surface corresponding to the function and control parameter. In the case of a binary control parameter the user interface 200 may include a control surface 202 which includes two radio buttons 206, 208. A first radio button 206 may allow a user to send a command turn the system module on by selecting the first radio button 206, which is labelled "on," and a second radio button 208 may allow a user to send a command turning the system module off by selecting the second radio button 208, which is labelled "off."

The system module may have a second function which has a control parameter which includes a range of values. For example, the range of values may be a wattage value, or may be an indexed number, for example 1 to 10, used to designate levels of resistance in a circuit, to control a volume level. As a part of the user interface 200, the software application may create a control surface corresponding to the function and control parameter. In the case of a control parameter with a range of values, the user interface 200 may include a control surface 204 which includes a scale of values. As shown in FIG. 2, the values range from 1 to 10. However, it is understood that the values may begin at any number, and may end at any number. The range of values may be more than 10, and the range of values may be less than 10. The user may slide the marker 210 along the scale 212 to each of the indexed positions in order to control the function.

In order to send commands to one or more modules, commands from the user interface on the controller or on the computing device are converted to control signals by the protocol. The control signal has two parts. The first part is the sinusoidal wave, which the crystal oscillation circuit generates continuously, as shown in Step 410 on FIG. 4. The second part is control information which is encoded on the sinusoidal wave, which is shown in Step 420 of FIG. 4. After generation, the sinusoidal wave is fed to the connected switch 114, as is described above. The switch 114 is also connected to a processor 124 which executes the protocol by operating the switch. Based on the command signals from the controller, which are converted by the processor using the protocol, the processor 124 directs the switch 114 to switch between the phase inversion circuit 116 and the bypass 118. Information is encoded on the sinusoidal waveform generated by the crystal oscillator circuit 110 by switching the switch 114 from the bypass 118 to the phase inversion circuit 114 and back to the bypass 118 in order to create phase inversion spikes at defined intervals on the sinusoidal wave. The phase inversion spikes and unaltered portions of the sinusoidal wave represent control information which may be decoded by the protocol. The unaltered sinusoidal wave combined with the control information may be called a control signal.

Figure 5:
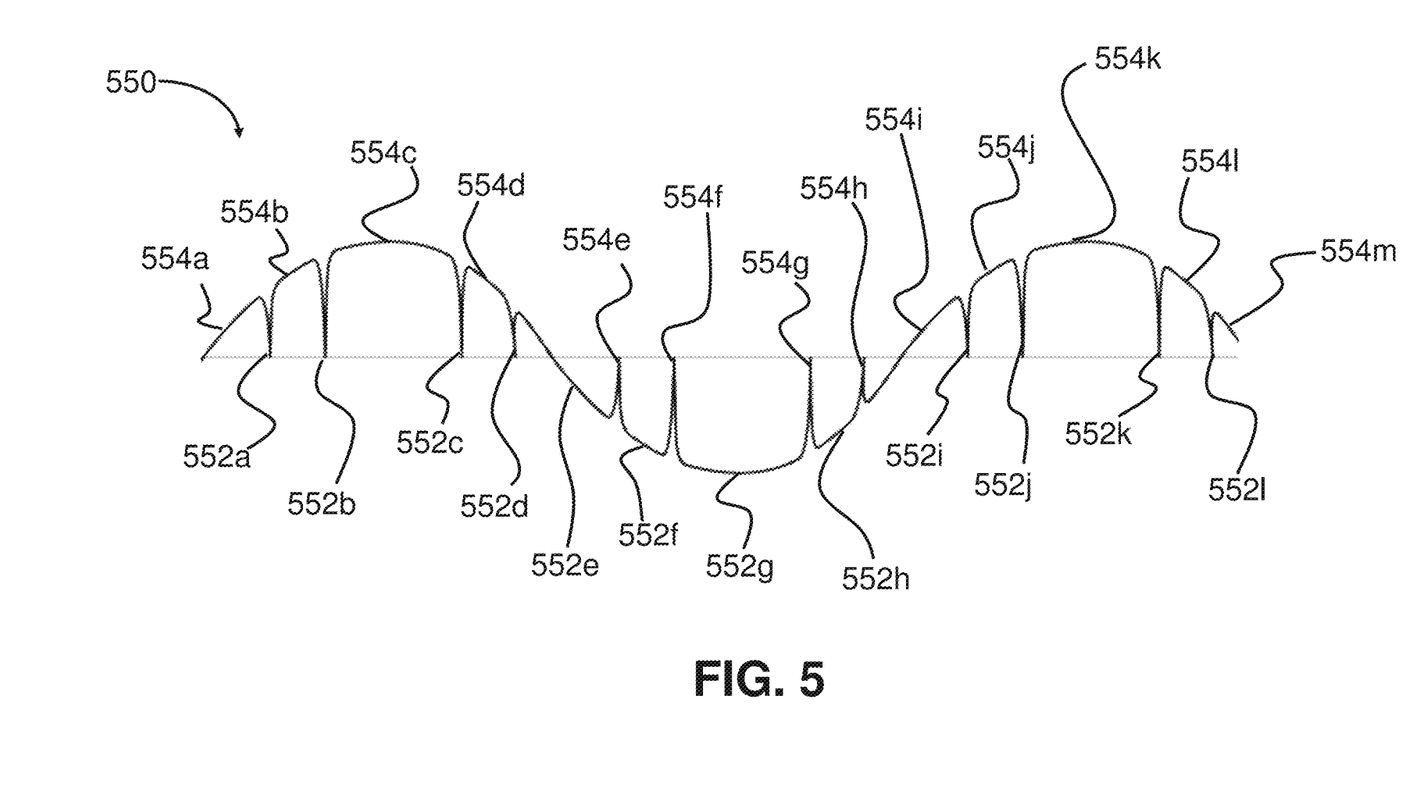
FIG. 5 shows a diagram of an emitter wave with information in the form of phase inversion spikes.

The timing for the phase inversions may be set to a fractional portion of the wave cycle of the crystal oscillator frequency by the protocol. Thus, where a phase inversion spike 552a-1 appears on the control signal 550, the protocol may interpret the phase inversion spike 552a-1 as indicative of a first binary state, while uninterrupted portions of the control signal 550 are interpreted as a second binary state. In this way, the protocol may interpret the control signal as a series of binary states, with the binary states representing either a one or a zero. Commands may be defined by the protocol from differing sequences of ones and zeros, or binary sequences.

Sequences of ones and zeros may form data or commands that can be analyzed and converted by the protocol. As an example, the light fixtures and separate temperature sensors may identify themselves using a binary code of a set number of digits. The identification may be a shorter or longer sequence than those of the commands. The protocol may define a preliminary indicator which indicates the start of a command or data string, and a second indicator which indicates the command or data send is complete and requests that the lighting fixture or fixtures, or temperature sensors to which the command was directed send an acknowledgement. Similarly, the protocol may use binary sequences to define commands. By way of example and not limitation, the protocol may define that "1001" may correspond to a command to turn a lighting fixture 130a-k to 100% of the wattage, while "1000" may correspond to a command to turn the lighting fixture 130a-k off. The data and commands may be packaged as messages that include the preliminary indicator that a command or data follows, headers which identify to which fans the command is directed, the command, and an indicator that the command is complete and a request for acknowledgement of the command by the lighting fixture or temperature sensor.

It is important to note that when the control information is added to the sinusoidal wave to create the control signal, the amplitude and frequency of the sinusoidal wave are unaffected. Rather, only the phase is changed in creating the phase inversion spikes. Thus, the control signal is output to the power line with the frequency unaffected from when the sinusoidal wave was generated by the crystal oscillator. Also, the amplitude is not changed, as the only amplification takes place within the crystal oscillation circuit.

Figure 4:
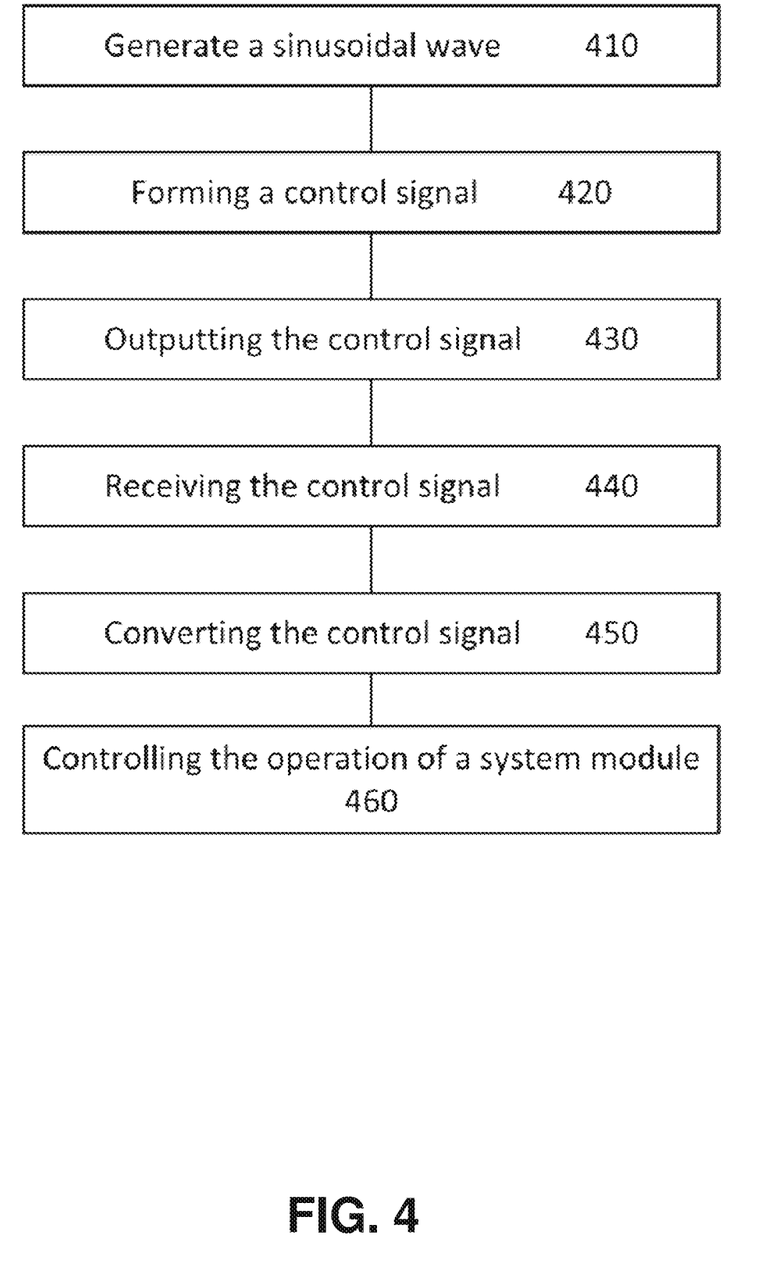
FIG. 4 shows a flowchart of power line control.

Once the control information is encoded on the sinusoidal wave generated by the crystal oscillator circuit 110, the control signal is output to the power line 114 as is shown in Step 430 of FIG. 4. The output is a broadcast throughout the power line 114. An exemplary control signal 550 is shown in FIG. 5. The control signal 550 includes a plurality of phase inversion spikes 552a-1. It will be noted that the phase inversion spikes 552a-1 are placed in protocol-defined intervals along the control signal 550, rather than one phase inversion spike 552a-1 after another with no unaltered portions 554a-m in between, although is also a possible arrangement, depending on the binary sequences defined in the protocol.

The smart home system may also use wireless connections in combination with the wired connection between the universal device and the one or more system modules for communication. For example, the computing device may connect to the universal device through a wireless connection, as discussed above. Further, the universal device may make use of a wireless connection to the cloud for certain functions. For example, the universal device may access the cloud to store configuration settings for the smart home system. Alternatively, or in addition, the smart home system may access code for creating user interfaces based on the self-identification information the system modules provide. Also, if a user is not collocated with the smart home system, the user may access the smart home system, and specifically the universal device, via the internet using the computing device. Thus, the universal device may have both a wired connection, for example, via power line, and a wireless connection via, for example, WiFi, to connected to a computing device via the internet as is well known in the art.

Because the universal device and the modules communicate via the protocol, and the bandwidth available via PLC is large in comparison to the data needs of the protocol, the communication between the universal device and the modules is fast. In fact, the universal device can communicate with each of the attached modules multiple times in a fraction of a second. Such a communication configuration allows for near instantaneous changes when required by a user.

As an alternative to PLC, the universal device may be connected to the modules through other wired connections. For example, a wiring infrastructure of ethernet cable may be created to connected each module to the universal device via one or more networking switches. Of course, such a wiring infrastructure has the disadvantage of cost to install the wiring and the cost of the wire itself as compared to the preexisting power lines. However, such a wiring infrastructure has the advantage of being the exclusive carrier of the control signals, and can be guaranteed to be free of any other signals if installed properly.

As yet another alternative, the universal device and the one or more system modules may communicate via a wireless connection. The universal device and the one or more system modules may use WiFi protocol, or Blutooth®, or other wireless protocols which allow the one or more system modules to exchange messages with the universal device.

Figure 3:
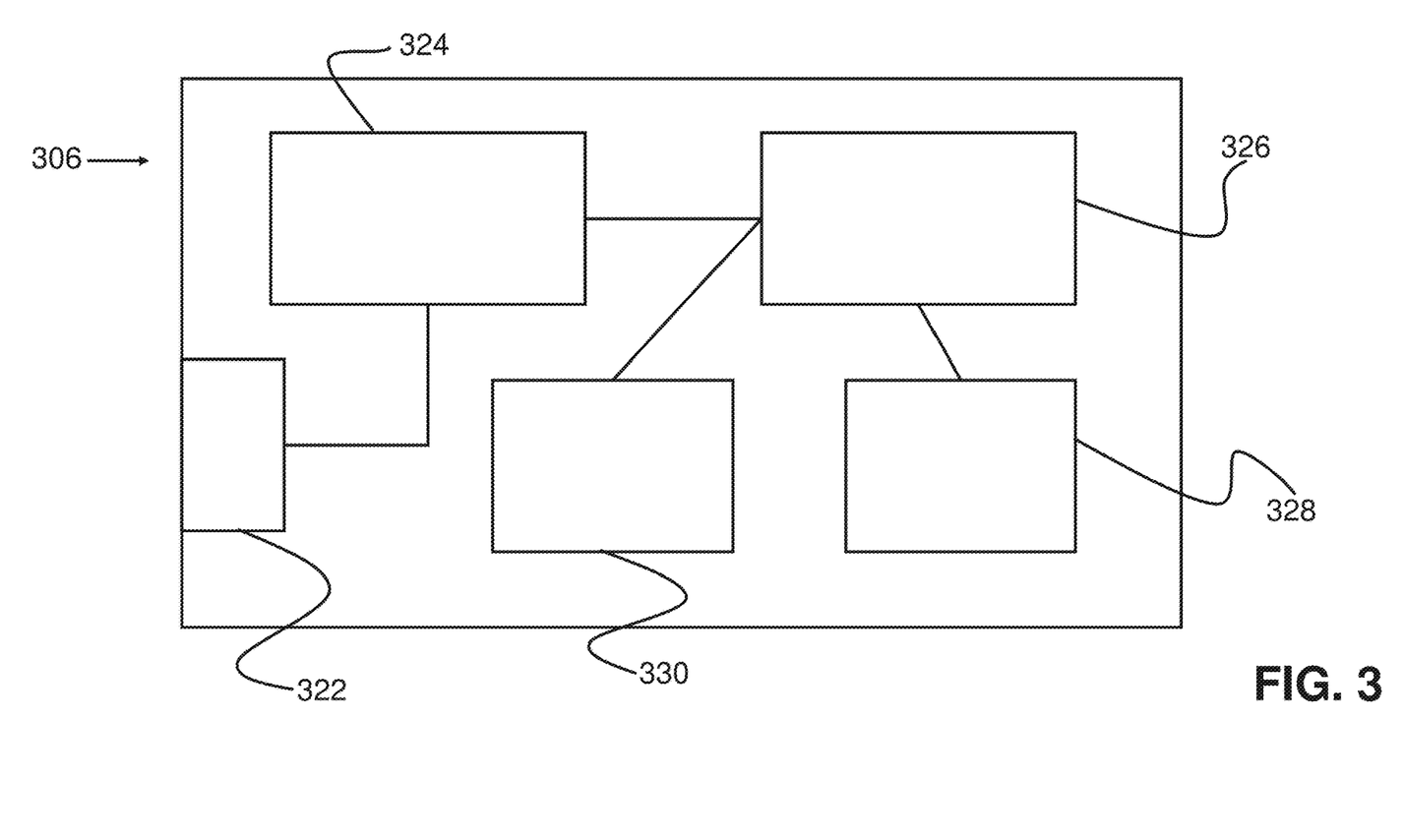
FIG. 3 shows a schematic view of a system module.

Referring now to FIGS. 3, 4, and 5, if PLC is being used, on the receiving end, the control signal 550 is received on an input/output port 322 and passed to the transceiver 324 of the one or more system modules 306, as is shown in Step 440 of FIG. 4. The crystal filter filters out only a bandwidth of 500 Hz or less centered on the transmission frequency of the crystal oscillator from the signal on the power line. Naturally, the rest of the signal on the power line may be band passed so that the power on the power line may be used to power the one or more modules and any peripheral devices which may be connected. The 500 Hz or less bandwidth captures the control signal because the phase inversions do nothing to spread the bandwidth of the original sinusoidal wave generated by the crystal oscillator. That is to say, the signal is not frequency modulated.

Following the filtering, the protocol stored on a memory 328, and executing on a processor 326 on the one or more system modules, detects and analyzes the information in the control signal 550. The control information encoded on the control signal 550 may be decoded and converted by the protocol as is shown in Step 450 of FIG. 4. The conversion may result in instructions which are executable to give commands to the unique circuitry and components 330 of the one or more modules 306 and to set control parameters for the functions of the system modules 306 as is shown in Step 460 of FIG. 4, and described above.

The use of ultra-narrow bandwidth and phase inversion spikes combined with protocol defined placement of phase inversions spikes and unaltered sinusoidal wave in the control signal provides robust protection against interference by electrical noise on the power line 114. In order for electrical noise on the system to interfere with the control signal the electrical noise would need both reach in to the narrow bandwidth on which the oscillator is transmitting, and the filter is receiving, and to invert its phase as the control signal 550 does. This kind of rapid phase inversion is uncommon in electrical noise, including the noise typically found on power lines. Thus, in addition to all the other ways the smart home system 100 eliminates electrical noise which may affect the control signal 550, even the manner in which the information is added to the sinusoidal wave 152 generated by the crystal oscillator circuit provides robustness against interference by electrical noise. This largely mitigates concerns about electronic noise interfering with the control signal, and makes a separate wiring infrastructure even less attractive, given the cost of a separate wiring infrastructure.

The one or more system modules may then execute the command sent. Contemporaneously, the one or more system modules may send a confirmation to the universal device that the command has been received. Once the command has been executed, the one or more system modules may further send an update to the universal device showing the current operating state, including the new parameter setting. The universal device may communicate with the computing device to confirm the new state of operation for the one or more system modules.

Below are provided a few nonlimited examples of embodiments described above.

In a 1st Example, a smart home system for controlling devices, comprising: a computing device; one or more system modules electrically connected to the computing device, the one or more system modules only including circuitry for performing one or more unique functions, a transceiver, a memory, and a processor, a protocol stored on the memory and executing on the processor to exchange messages, including initialization information, with the computing device; a universal device interposed between the computing device and the one or more system modules, so that the universal device exchanges messages with both the computing device and the one or more system modules, the universal device including a transceiver for sending data to, and receiving data from, the computing device; and a software application stored on non-transient media on the computing device which includes instructions for requesting the initialization information from the one or more system modules, and allowing a user to execute the one or more unique functions of the modules.

In a 2nd Example, the method of Example 1, wherein the initialization information includes the one or more unique functions and control parameters are for the one or more unique functions.

In a 3rd Example, the method of any of Examples 1-2, wherein the software application further includes instructions for creating a user interface based on the initialization information.

In a 4th Example, the method of Example 3, wherein the user interface includes one or more control surfaces which generate commands for changing control parameters on a corresponding one of the one or more system modules.

In a 5th Example, the method of Example 4, wherein a user operates the control surfaces on a touch screen display of the computing device.

In a 6th Example, the method of any of Examples 1-5, wherein the one or more system modules are connected to the universal device via a wired connection.

In a 7th Example, the method of Example 6, wherein the wired connection is made using a power line.

In an 8th Example, a method for providing control of a smart home system, comprising:
  providing a computing device including a display; connecting a universal device to the computing device via a wired or wireless connection; connecting one or more system modules to the universal device via a wired or wireless connection, the one or more system modules and the universal device communicating using an open source protocol; sending a message from the computing device to the one or more system modules requesting initialization information; sending a message from the one or more system modules to the computing device including the initialization information, the initialization information including information regarding one or more unique functions of the corresponding one of the one or more system modules and control parameters of the one or more functions; creating a user interface for displaying on the display of the computing device, the user interface including control surfaces which, when manipulated by a user, cause a change in a value of one of the control parameters of one of the one or more functions of the peripheral device.

In a 9th Example, the method of Example 8, wherein the connection between the universal device and the one or more system modules is a wired connection.

In a 10th Example, the method of Example 9, wherein the wired connection is made through power lines.

In an 11th Example, the method of any of Examples 8-10, wherein the open source protocol is a power line communication protocol.

In a 12th Example, the method of any of Examples 8-11, wherein the one or more system modules each include one or more unique functions, circuitry for performing the one or more unique functions, a transceiver, a memory, and a processor, a protocol stored on the memory and executing on the processor.

In a 13th Example, a smart home system for providing ubiquitous control, comprising: a computing device for sending commands which are interpreted by a protocol; a universal device including a transceiver for sending data to, and receiving data from, the computing device, and a non-transient media containing the protocol; one or more system modules connected to the universal device, the one or more system modules each including one or more unique functions, the one or more system modules communicating with the universal device using the protocol; and a software application stored on non-transient media on the computing device, the software application including instructions for requesting the initialization information from the one or more system modules and instructions for creating a user interface based on the initialization information, the user interface including one or more control surfaces which correspond to the one or more unique functions identified in the initialization information.

In a 14th Example, the system of Example 13, wherein the universal device and the one or more system modules are connected via a wireless connection.

In a 15th Example, the system of any of Examples 13-14, wherein the universal device and the one or more system modules are connected via a wired connection.

In a 16th Example, the system of Example 15, wherein the wired connection is made through a power line.

In a 17th Example, the system of any of Examples 13-16, wherein the protocol provides for communication via power line communication.

In a 18th Example, the system of any of Examples 17, wherein the power line communication includes adding control information to a sinusoidal wave created by a crystal oscillator.

In a 19th Example, the system of any of Examples 13-18, wherein the one or more control surfaces generate commands for changing control parameters on a corresponding one of the one or more system modules.

In a 20th Example, the system of any of Examples 13-19, including two or more system modules, the two or more system modules having only the transceiver circuit in common.

The above description is given by way of example, and not limitation. Given the above disclosure, one skilled in the art could devise variations that are within the scope and spirit of the invention disclosed herein, including various ways of connecting the system modules for communication. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A smart home system for controlling devices, comprising:
  a computing device comprising non-transitory memory storing instructions thereon;
  a universal device operatively coupled to the computing device, the universal device comprising:

a transceiver for sending data to, and receiving data from, the computing device; and a crystal oscillator configured to produce a sinusoidal wave comprising control information, wherein the sinusoidal wave comprises a plurality of phase inversion spikes, wherein the plurality of phase inversion spikes are each generated at an interval determined based in part on a protocol; and one or more system modules electrically connected to the universal device, the one or more system modules comprising circuitry for performing one or more unique functions based on the control information, the one or more system modules further comprising a transceiver circuit, a memory, and a processor, wherein the protocol stored on the respective memory is configured to be executed by the respective processor to exchange messages, including initialization information, with the universal device via one or more power lines;

wherein the instructions, when executed by the computing device, are configured to:
  transmit a command to the universal device, the command configured to cause the universal device to generate control information and to request, based on the control information, the initialization information from the one or more system modules;
  receive, from the universal device, the initialization information associated with the one or more system modules;
  receive user input; and
  transmit to the universal device, based on the user input, a second command configured to cause the one or more system modules to execute the one or more unique functions.

2. The smart home system of claim 1, wherein the initialization information includes the one or more unique functions and control parameters for the one or more unique functions.

3. The smart home system of claim 1, wherein the instructions are further configured to creating a user interface based on the initialization information.

4. The smart home system of claim 3, wherein the user interface includes one or more control elements configured to generate commands for changing control parameters on a corresponding one of the one or more system modules.

5. The smart home system of claim 4, wherein the control elements are disposed on a touch screen display of the computing device.

6. The system of claim 1, wherein the universal device further comprises a switch, and wherein the plurality of phase inversion spikes are each generated based on changing a position of the switch between a first position and a second position.

7. The system of claim 6, wherein the first position of the switch operatively couples the switch to a phase inversion circuit, and wherein the phase inversion circuit generates the plurality of phase inversion spikes.

8. A method for providing control of a smart home system, comprising:
  providing a computing device including a display;
  connecting a universal device to the computing device via a wired or wireless connection, wherein the universal device comprises:
    a transceiver for sending data to, and receiving data from, the computing device, and
    a crystal oscillator configured to produce a sinusoidal wave comprising control information;
  connecting one or more system modules to the universal device via a power line connection, the one or more system modules and the universal device communicating using an open source protocol, wherein the one or more system modules comprise circuitry for performing unique functions based on the control information;
  transmitting a command, from the computing device, to the universal device, the command configured to cause the universal device to generate control information and to request, based on the control information, the initialization information from the one or more system modules;
  sending a sinusoidal wave comprising a message from the universal device to the one or more system modules requesting initialization information via the power line connection, wherein the sinusoidal wave comprises a plurality of phase inversion spikes, and wherein the plurality of phase inversion spikes are each generated at an interval determine based in part on the open source protocol;
  sending a message from the one or more system modules to the universal device including the initialization information, the initialization information including information regarding one or more unique functions of a corresponding one of the one or more system modules and control parameters of the one or more unique functions;
  creating a user interface on the display of the computing device, the user interface including control surfaces which, when manipulated by a user, cause a change in a value of one of the control parameters associated with the one or more system modules;
  receiving, via the user interface, user input; and
  transmitting to the universal device, based on the user input, a second command configured to cause the one or more system modules to execute the one or more unique functions.

9. The method of claim 8, wherein the connection between the universal device and the one or more system modules is a wired connection.

10. The method of claim 9, wherein the wired connection is made through power lines.

11. The method of claim 8, wherein the open source protocol is a power line communication protocol.

12. The method of claim 8, wherein the one or more system modules each include one or more unique functions, circuitry for performing the one or more unique functions, a transceiver, a memory, and a processor, a protocol stored on the memory and executing on the processor.

13. A smart home system for providing ubiquitous control, comprising:
  a computing device for sending commands which are interpreted by a protocol;
  a universal device operatively coupled to the computing device, the universal device comprising:
    a transceiver for sending data to, and receiving data from, the computing device;
    a crystal oscillator configured to produce a sinusoidal wave comprising control information, wherein the sinusoidal wave comprises a plurality of phase inversion spikes, wherein the plurality of phase inversion spikes are each generated at an interval determined based in part on a protocol; and
    a non-transitory storage medium containing the protocol and instructions thereon; and
  one or more system modules connected to the universal device via one or more power lines, the one or more system modules each configured to perform one or more unique functions based on the control information, the one or more system modules communicating with the universal device using the protocol via the one or more power lines;

wherein the instructions, when executed by the universal device, are configured to:
  receive a command, from the computing device, to generate control information;
  request, based on the control information, initialization information from the one or more system modules via the one or more power lines;
  transmit to the computing device the initialization information;
  generate data for creating a user interface based on the initialization information, the user interface including one or more control elements which correspond to the one or more unique functions identified in the initialization information;
  receive, based on user input received via the user interface, a second command configured to cause the one or more system modules to execute the one or more unique functions.

14. The system of claim 13, wherein the universal device and the one or more system modules are further connected via a wireless connection.

15. The system of claim 13, wherein the protocol provides for communication via power line communication.

16. The system of claim 15, wherein the power line communication includes adding control information to a sinusoidal wave created by the crystal oscillator.

17. The system of claim 13, wherein the one or more control elements are configured to generate commands for changing control parameters on a corresponding one of the one or more system modules.

18. The system of claim 13, including two or more system modules, the two or more system modules having only a transceiver circuit in common.

* * * * *